(No Model.) 2 Sheets—Sheet 1.

G. G. CROWLEY.
HARROW.

No. 333,926. Patented Jan. 5, 1886.

Witnesses: Chas. J. Buchheit, Thos. L. Popp

G. G. Crowley, Inventor.
By Wilhelm & Bonner,
Attorneys.

(No Model.) 2 Sheets—Sheet 2.
G. G. CROWLEY.
HARROW.
No. 333,926. Patented Jan. 5, 1886.
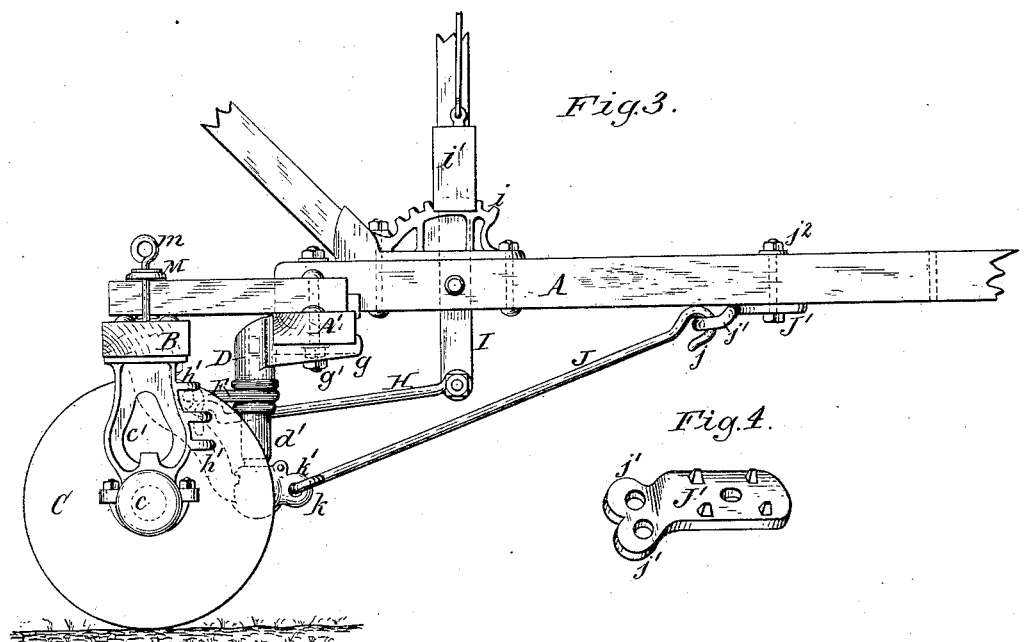
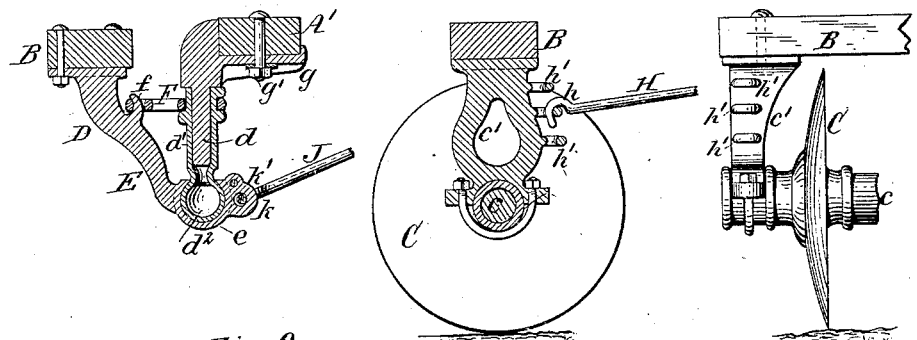
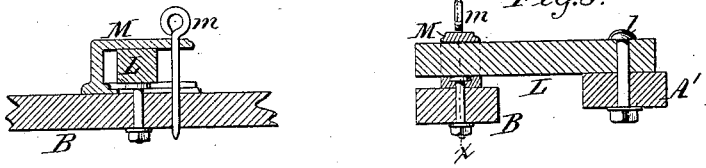
Witnesses: Chas. J. Buchheit, Theo. L. Popp
G. G. Crowley, Inventor.
By Wilhelm Bonner,
Attorneys.

UNITED STATES PATENT OFFICE.

GEORGE G. CROWLEY, OF LITTLE FALLS, NEW YORK, ASSIGNOR TO THE WARRIOR MOWER COMPANY, OF SAME PLACE.

HARROW.

SPECIFICATION forming part of Letters Patent No. 333,926, dated January 5, 1886.

Application filed July 6, 1885. Serial No. 170,687. (No model.)

*To all whom it may concern:*

Be it known that I, GEORGE G. CROWLEY, of Little Falls, in the county of Herkimer and State of New York, have invented new and useful Improvements in Harrows, of which the following is a specification.

This invention relates to an improvement in that class of harrows which are provided with concavo-convex disks attached in gangs to planks which are connected with the main frame by swiveling joints, so that the disk-gangs can adjust themselves to the inequalities of the ground. It is often desirable to reverse the disk-gangs, so as to turn the convex side of the disks inward or outward for throwing the earth inward or outward, or for adapting the harrow to the particular kind of soil in which it is required to work. Heretofore this object has been attained in disk-cultivators by making each gang adjustable on a pivot, so that the gang can be turned or reversed on the pivot and then be secured in the desired position. This construction is not applicable to ordinary disk-harrows, because in the same the disks are not arranged in equal numbers on opposite sides of the gang-hinge.

One object of my invention is to render the two gangs of an ordinary disk-harrow interchangeable, thereby enabling the disks to be reversed at will, and to be placed either with the convex or the concave sides of the disks outside.

Another object of my invention is the construction of a simple and effective stiffening device, whereby each gang can be locked rigidly in position, if desired.

Another object of my invention is to improve the connection of the draft-rods and braces with the gangs.

My invention consists, to these ends, of the improvements which will be hereinafter fully set forth, and pointed out in the claims.

Figure 1:
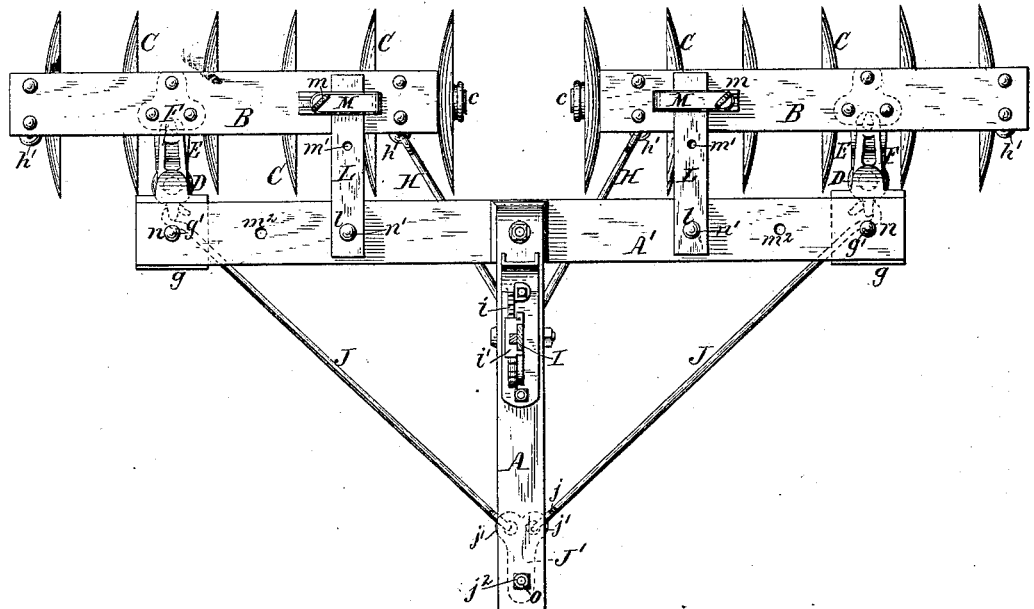
Figure 2:
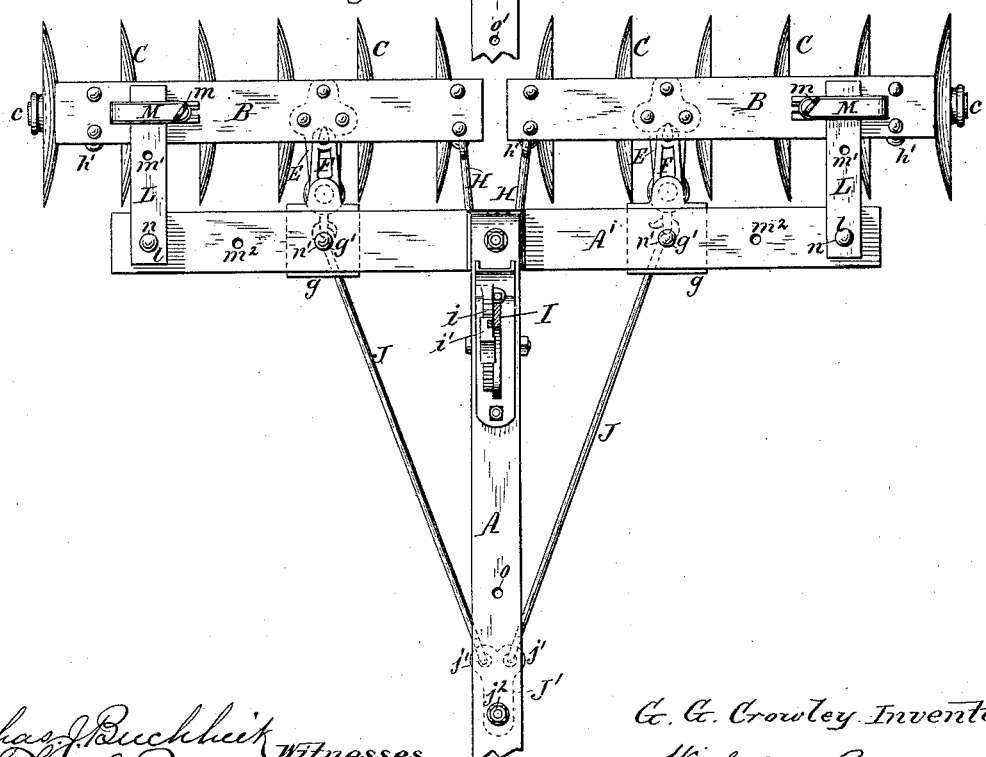

In the accompanying drawings, consisting of two sheets, Figure 1 is a top plan view of a harrow provided with my improvements, and having the convex sides of the disks turned outward. Fig. 2 is a top plan view of the harrow with the disk-gangs reversed. Fig. 3 is a side elevation of the harrow. Fig. 4 is a perspective view of the plate to which the front ends of the braces are attached. Fig. 5 is a sectional elevation of the hinge-joint. Fig. 6 is a sectional elevation of one of the gangs. Fig. 7 is a front elevation of one end of a gang. Fig. 8 is a sectional elevation of the device for stiffening the gang. Fig. 9 is a vertical section in line $x\,x$, Fig. 8.

Like letters of reference refer to like parts in the several figures.

A represents the draft-pole, and A' the cross-piece secured to the rear end of the same, both constituting together the rigid harrow-frame.

B represents the gang-planks, and C the harrow-disks, mounted upon shafts $c$, which are journaled in depending bearings $c'$, secured to the under sides of the gang-planks B.

D represents the swiveling connections or hinges whereby the gang-planks are attached to the cross-piece A'. These hinges consist each of a downwardly-projecting pin, $d$, secured to the under side of the cross-piece A', a sleeve, $d'$, fitted on the pin $d$, and provided at its lower end with a spherical knuckle, $d^2$, and a spherical socket, $e$, which embraces the knuckle $d^2$, and is provided with an arm, E, which is secured to the under side of the gang-plank. The socket $e$ is provided with a removable cap for attaching it to the knuckle $d^2$.

$f$ is a hook formed on the front side of the arm E, and F is a link which connects the hook $f$ with the upper portion of the sleeve $d'$. The link swivels on the hook $f$ and permit the socket $e$ to turn on the knuckle $d^2$ when the gang changes its position vertically with reference to the cross-piece A', while the link turns on the sleeve $d'$, or with the sleeve when the gang changes its position horizontally, for instance, in changing its angle to the line of draft. The pin $d$ is provided with a flange or plate, $g$, which is fitted against the under and rear sides of the cross-piece A', and which is secured to the cross-piece by a vertical bolt, $g'$.

H represents the draft-rods which connect the inner ends of the gangs with the hand-lever I, by which the angle of the gangs is adjusted. The lever I is pivoted to the pole A, and made adjustable on the same by a toothed segment, $i$, and a catch, $i'$, in a well-known manner. The draft-rods H are attached with their front ends to the lower end of the lever I, and are provided at their rear ends with hooks $h$, which engage each in one of a vertical series of eyes, $h'$, formed on the front sides of the bearings $c'$. By engaging the rear ends of the draft-rods with the eyes $h'$ higher or lower on the bearings $c'$ the height of the rear ends of the draft-rods is regulated, thereby changing the inclination of the draft-rods accordingly, and regulating the depth to which the inner ends of the gangs run into the ground. By engaging the draft-rod H in the lower eye $h'$ the draft on that end of the gang is given more of an upward direction, which prevents the disks from cutting into ground as deeply as if the rod is engaged in the upper eye.

J represents the braces which connect the outer portions of the gangs with the draft-pole A. The braces J are provided at their front ends with hooks $j$, which engage in eyes $j'$, formed in a plate, J', which is secured to the under side of the draft-pole by a bolt, $j^2$. The rear ends of the braces J are provided with hooks $k$, which engage in eyes $k'$, formed at the front sides of the spherical sockets $e$, so that the latter are directly connected by the braces with the draft-pole, thereby relieving the depending hinges largely from the strains resulting from the draft.

L represents the stiffening-bars, which are pivoted to the cross-piece A' by vertical bolts $l$, and which engage with their rear ends in brackets M, secured to the upper sides of the gang-planks B. The bars L are secured in the brackets M by vertical bolts $m$, which can be easily withdrawn when it is desired to disconnect the bars from the brackets. Upon engaging the bars L in the brackets M the disk-gangs are held rigidly in position with reference to the cross-piece A', while upon disconnecting the bars from the brackets the gangs are free to move on their hinges. When the stiffening-bars are not used, they are swung back on the cross-piece A', and locked to the same by passing the bolts $m$ through openings $m'$ $m^2$, formed, respectively, in the bars and in the cross-piece.

As shown in Fig. 1, the disks C are arranged with their convex sides outward. In this position of the gangs the hinges D are arranged at the outer ends of the cross-piece A', and secured thereto by the bolts $g'$, passing through the outer openings, $n$, of the cross-piece, while the pivot-bolts $l$ of the locking-bars L pass through the inner openings, $n'$, of the cross-piece. The plate J', to which the front ends of the braces J are connected, is secured to the draft-pole by the bolt $j^2$, passing through the rear opening, $o$, of the pole. When it is desired to reverse the arrangement of the disks, so as to place their concave sides outward, the braces and draft-rods are disconnected from the gangs, the hinges of the latter are disconnected from the cross-piece, and the stiffening-bars L are also detached from the cross-piece. The two gangs are now interchanged and their hinges are attached to the cross-piece A' by passing their fastening-bolts $g'$ through the inner openings, $n'$, of the cross-bar. The plate J' is placed farther forward on the pole, and fastened thereto by passing its bolt $j^2$ through the front opening, $o'$, of the pole. The braces J and draft-rods H are then again connected with their rear ends to the gangs, and the stiffening-bars L are attached to the cross-piece A' by passing their pivot-bolts $l$ through the outer openings, $n$, of the cross-piece. This arrangement of the parts is represented in Fig. 2. In this manner the arrangement of the disks is readily reversed, thereby adapting the machine to be used in a variety of soils and under a variety of circumstances without complicating the working parts or increasing the cost of the machine materially.

I claim as my invention—

1. The combination, with the harrow-frame A A', provided with a pair of openings, $n$ $n'$, on each side of the machine, of two interchangeable disk-gangs, each provided with a hinge, D, and a fastening-bolt, $g'$, which may be passed through either of the openings $n$ $n'$, and whereby the hinge can be secured at different distances from the center of the machine, draft-rods H, adjustably connected to the harrow-frame, and eyes $h'$, attached to each gang, near both ends thereof, for the attachment of the draft-rods, substantially as set forth.

2. The combination, with the harrow-frame A A', provided with a pair of openings, $n$ $n'$, on each side of the machine, of two interchangeable disk-gangs, each provided with a hinge, D, and a fastening-bolt, $g'$, which may be passed through either of the openings $n$ $n'$, and whereby the hinge can be secured at different distances from the center of the machine, draft-rods H, adjustably connected to the harrow-frame, eyes $h'$, attached to each gang, near both ends thereof, for the attachment of the draft-rods, and braces J, attached with their rear ends to the hinges D, and having their front ends adjustably connected to the harrow-frame, substantially as set forth.

3. The combination, with the harrow-frame and the hinged disk-gangs, of draft-rods H, having their rear ends made vertically adjustable on the gangs, substantially as set forth.

4. The combination, with the harrow-frame and the hinged disk-gangs provided with vertical series of eyes $h'$, of the draft-rods H, having their rear ends attached to said eyes and their front ends adjustably connected to the harrow-frame, substantially as set forth.

5. The combination, with the pole A, rigid cross-piece A', and hinged disk-gangs, of the pins $d$, secured to the cross-piece, the sleeves $d'$, applied to said pins, the sockets $e$, attached to the gangs, and the braces J, connecting said sockets with the pole, substantially as set forth.

Witness my hand this 25th day of June, 1885.

G. G. CROWLEY.

Witnesses:
M. G. ELLIOTT,
S. H. GREEN.